United States Patent [19]

Smith et al.

[11] 4,022,948
[45] May 10, 1977

[54] RESILIENTLY COATED METALLIC FINGER SEALS

[75] Inventors: William E. Smith; Roy G. Nelson, both of Lake Park, Fla.

[73] Assignee: United Technologies Corporation, Hartford, Conn.

[22] Filed: Dec. 23, 1974

[21] Appl. No.: 535,645

[52] U.S. Cl. .......................... 428/542; 239/265.39; 277/235 R; 428/447; 428/448; 428/450
[51] Int. Cl.² ............................................ B32B 9/04
[58] Field of Search ................ 239/265.39, 265.43; 428/542, 450, 447, 448, 114, 161, 163, 164, 165, 452; 277/235 R

[56] References Cited

UNITED STATES PATENTS

| | | | |
|---|---|---|---|
| 2,865,165 | 12/1958 | Kress | 239/265.39 |
| 2,901,829 | 11/1959 | Meyer | 239/265.39 X |
| 3,179,546 | 4/1965 | Fischer | 428/447 |
| 3,354,649 | 11/1967 | Madden | 239/265.39 X |
| 3,368,928 | 2/1968 | Chodha et al. | 428/447 X |
| 3,403,858 | 10/1968 | Kurti et al. | 239/265.39 |
| 3,455,762 | 7/1969 | Harper | 428/450 X |
| 3,505,099 | 4/1970 | Neuroth | 428/447 |
| 3,667,993 | 6/1972 | Stevenson | 428/447 |
| 3,730,436 | 5/1973 | Madden et al. | 239/265.39 |
| 3,792,815 | 2/1974 | Swavely et al. | 239/265.39 |
| 3,892,358 | 7/1975 | Gisslen | 239/265.39 |

*Primary Examiner*—Marion E. McCamish
*Attorney, Agent, or Firm*—Jack N. McCarthy

[57] ABSTRACT

The resiliently coated metallic finger seal described herein is formed of two metallic seal members being fixed together at one end with fingers projecting rearwardly therefrom. The fingers on each member are offset so that the slits of each metallic seal member are not aligned. The fingers of the two members are then encapsulated by a resilient coating material, such as a room temperature vulcanizing silicone rubber. The seal means is described as annular and can be constructed of one piece or a plurality of sections. In constructing the seal means the metallic seal members are cleaned, primed where it is desired to have the resilient coat permanently affixed, and the resilient coat is then applied. The resilient coat does not cover the entire fingers so that the proper flexibility at the hinge location will remain. After curing of the resilient coating material a heat reflecting and lubricating material is placed thereon.

2 Claims, 6 Drawing Figures

U.S. Patent  May 10, 1977  4,022,948
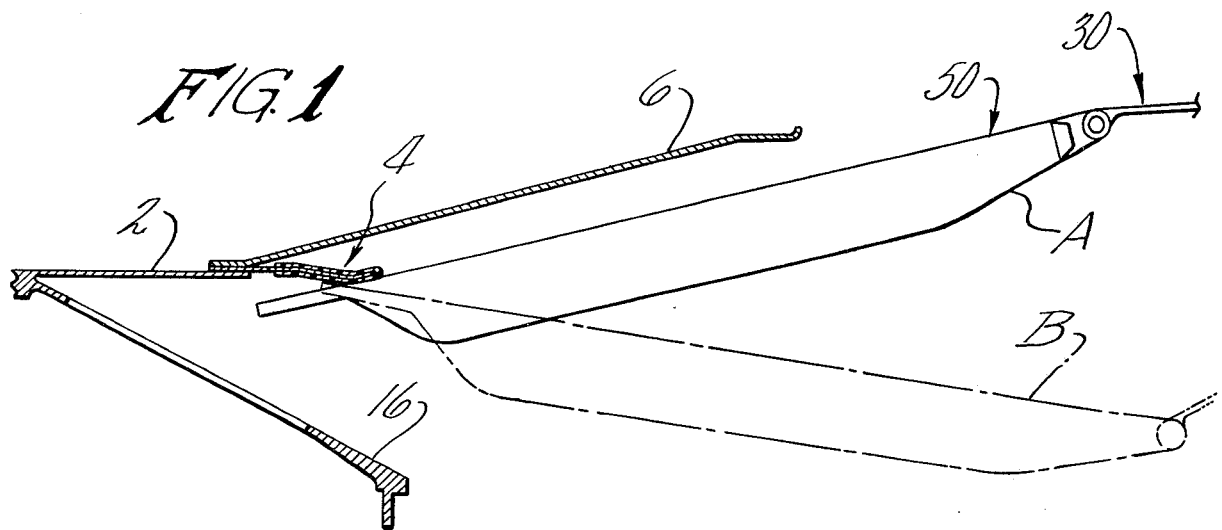
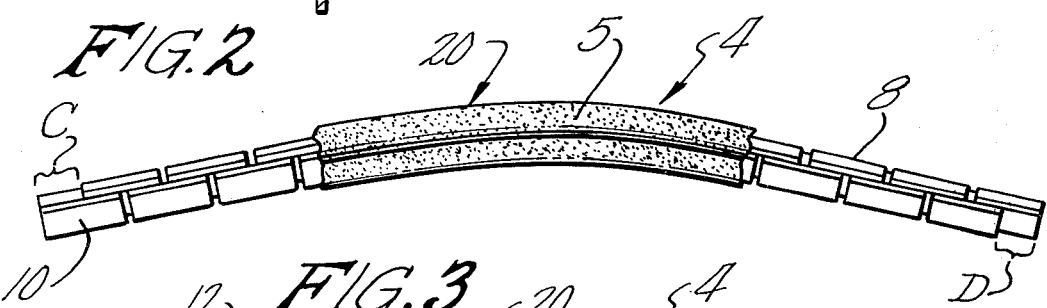
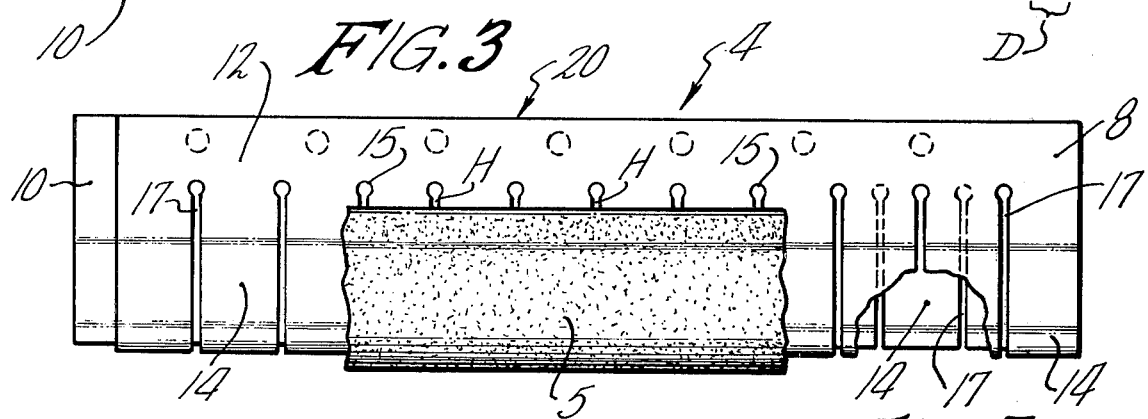
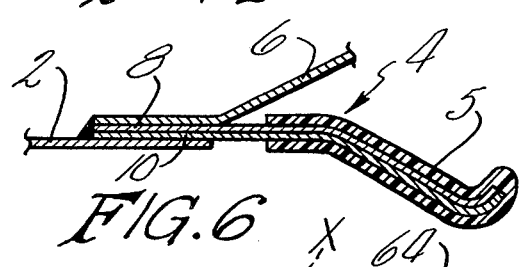
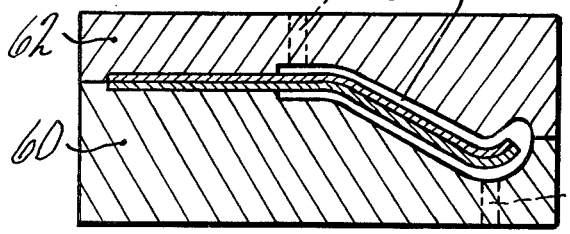
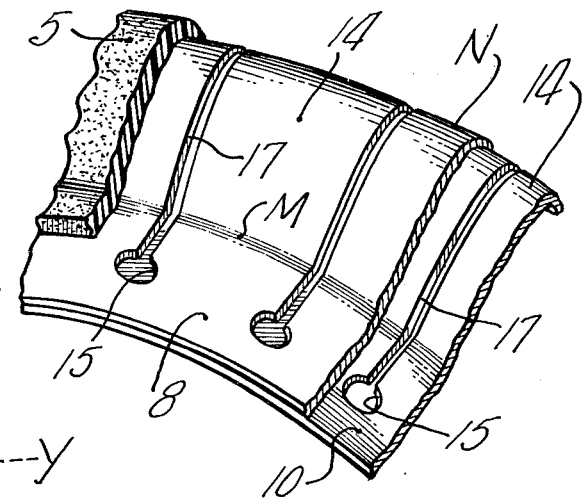

RESILIENTLY COATED METALLIC FINGER SEALS

The invention herein described was made in the course of or under a contract with the Department of the Air Force.

BACKGROUND OF THE INVENTION

This invention relates to sealing means having a resilient coat for providing a close seal between a stationary member and a movable member having an irregular surface. p A prior art sealing arrangement is shown in U.S. Pat. No. 2,865,165; note FIGS. 7–9 thereof where the engaging surfaces have metal to metal contact. A similar sealing arrangement is shown in U.S. Pat. No. 3,403,858.

SUMMARY OF THE INVENTION

A primary object of the present invention is to provide a seal means between a fixed duct and a nozzle having movable flaps for controlling flow at the outlet of the duct and preventing leakage between the duct and cooperating ends of the flaps. A nozzle of the type referred to is shown in U.S. Pat. No. 3,792,815.

Another object of the invention is to provide a method for placing a resilient coating on metallic finger seals to form a seal where one part to be sealed has an irregular surface.

A further object of the invention is to provide metallic finger seals encapsulated with silicone rubber or similar resilient material.

Another object of the invention is to provide a material over the metallic fingers of the seals to increase the sealing ability of the fingers yet retain their flexibility.

A further object of the invention is to provide a heat shielding material coating over the resilient coating.

Another object of the invention is to provide a dry lubricating material on the resilient coating where it engages the moving flaps. This provides for a reduction in wear.

BRIEF DESCRIPTION OF THE DRAWINGS

FIG. 1 is a cross-sectional view showing a resiliently coated finger seal used for sealing between an exhaust duct and movable flaps.

FIG. 2 is a rear view of a section of the coated finger seal.

FIG. 3 is a top view of a section of the coated finger seal.

FIG. 4 is an enlarged view of the coated finger seal as set forth in FIG. 1.

FIG. 5 is an enlarged section in perspective of the coated finger seal shown in FIG. 3.

FIG. 6 is a sectioned view of a two part mold with an uncoated finger seal fixed therein.

DESCRIPTION OF THE PREFERRED EMBODIMENT

FIG. 1 shows the rear end of a circular exhaust duct 2 of a jet engine having a resiliently coated finger seal means 4 fixed to the rear end thereof for engagement with balance flaps 50, and seal flaps between the flaps (not shown) which are shown in U.S. Pat. No. 3,730,436, of the nozzle. The flaps 50 pivot between the position A shown in solid lines and the position B shown in phantom lines. In the embodiment shown the front end of the flaps 50 are arranged to slide axially in track means not shown. A schematic showing of this appears in U.S. Pat. No. 3,792,815, referred to above.

The rear end of each flap 50 is connected to a front end of a flap 30 which is pivotally mounted to fixed structure of the engine. The member 16 is a conical shaped connecting member which extends outwardly from duct 2 to outer housing structure (not shown) which supports the pivotal mountings of flap 30. An annular member 6 extends rearwardly from the duct 2 to carry the exhaust to a point adjacent the front end of the flaps 30.

FIG. 4 is an enlarged sectional view showing a construction of the coated finger seal means 4. The resiliently coated finger seal 4 includes two metallic members 8 and 10. Each member has a front solid portion 12 while the rear portion is formed with a plurality of fingers 14. The fingers 14 are shown bent outwardly at M to contact the surface of the flaps 50, and any seal members between the flaps, at the positions A and B of FIG. 1 and all positions therebetween. The fingers 14 are also provided with a curvature at N to have a smooth contact line mating components of the nozzle. While the resiliently coated finger seal means 4 can be annular it can also be composed of a plurality of segments 20. Whether the finger seal means 4 is made as an integral circular member or from segments, the method of applying the resilient coat 5 to the finger seals is the same.

In constructing a finger seal means 4 in either a full circular shape or formed of segments, the fingers 14 of each of the metallic members 8 and 10 are offset so that there is no direct line of sight opening through the two members 8 and 10. The resilient coat 5 which is placed over the fingers 14 of both of the metallic members 8 and 10 extends to a point just short of the forward ends 15 of the slots 17 between the fingers 14. This prevents interference with the spring hinge action of the fingers 14.

The resilient coat is bonded to predetermined outer exposed portions of the two metallic members 8 and 10 of the finger seal means 4. In applying the resilient coat it is permitted to fill the slots 17 at H to the surface of both metallic members in which it appears. When segments are used the resilient coat is not placed over areas C and D as these areas of each segment overlap the cooperating areas of adjacent segments, when a full annular seal means 4 is formed.

In a construction made, the finger seal means 4 around the exhaust duct 2 of a jet engine was made from fifteen (15) segments 20. While the front solid portion 12 of the seal segment 20 is formed as an arc of a circle so as to smoothly contact the rear of the exhaust duct 2, the fingers 14 of the segment form substantially a wide V (see FIG. 2). The jet engine also had fifteen (15) flaps and the fifteen (15) flaps 50 and segments 20 were circumferentially offset so that one side of a flap 50 would contact one side of a segment 20, and an adjacent side of an adjacent 50 would contact the other side of the segment 20.

The method for forming a segment 20 will be herein described:

1. Form two metallic members 8 and 10 of a desired arc of a circle at their forward end to coact with an exhaust duct 2 and shaped at their rearward end to receive a predetermined number of flaps.

2. Form the rear part of said members 8 and 10 having fingers 14 with slots 17 therebetween and curved at M and N.

3. Fix the two metallic members 8 and 10 together in an offset manner so that the slots 17 of each metallic member are positioned approximately midway between the fingers 14 of the other metallic member, leaving the areas C and D exposed at each end and with mating surfaces being in intimate contact.

4. Clean the metallic members with solvent, such as methyl ethyl ketone. If necessary, this area to be covered by the resilient coating can be lightly vapor blasted with a solution of water, rust inhibitor, and abrasive grit.

5. Apply a thin layer of a primer to the two metallic members on their exposed surfaces where the coating is to be placed. The primer is not placed between the cooperating faces of the fingers 14 of both members 8 and 10 or on areas C and D. This primer prevents the formation of oxides on the surfaces where it is desired to have a permanently bonded resilient coating.

6. Place the resilient coating on the two metallic members 8 and 10 where desired. This has been done in two ways A. The resilient coating material used was a room temperature vulcanizing silicon rubber and it was placed in an uncured state on the desired surfaces of two metallic members 8 and 10; the coated finger seal section 20 was then placed in a concave mold 60; a mating convex mold 62 was placed thereover; the molds were weighted to form the resilient coating material of the proper size as determined by the mold, as seen in FIG. 6 a space 64 is formed around the fingers 14 which is the desired shape and in the desired location of the resilient coat with respect to the joined members 8 and 10. The material is then permitted to cure and become bonded to its members 8 and 10. Some silicone rubbers need an assist by moisture for curing. In this instance the molds can be constructed to be placed in water for curing.

B. The joined members 8 and 10 were placed in a mold having a similar shape as described for (A) except that the members 8 and 10 are first positioned between the concave and convex portions with the forward end being held in position by the forward parts of the mold. This can be done by bolt means. The molds of both ways permit the resilient coat 5 to extend to a point short of the forward ends 15 of the fingers and not to the areas C and D. After the molds are fixed together the uncured resilient coating material is injected through an opening in a mold such as at X where it fills the mold around the exposed parts of the members 8 and 10 and then exits through another opening in a mold such as at Y. The injection is stopped when the material exits at Y and the material is permitted to cure.

7. After curing and removing the segment 20 from the mold, it is coated with a heat reflecting and lubricating material, such as BT-1-1, a product of Andrew Brown Company, Irving, Texas. This coat may be sprayed or dipped on and is a high brilliance aluminum enamel with the following composition by weight:
Resin — 25.5 – 27.5
Pigment — 16.5 – 18.5
Volatile — 55.00 – 58.0

Resilient coating materials which have been used are (1) Compound DC92-024 by Dow Corning Corporation and (2) RTV-60 by General Electric.

A primer used for Compound DC92-024 and RTV-60 was Compound DC-1200 by Dow Corning Corporation and another primer which can be used for RTV-60 is SS-4101 by General Electric.

To aid in curing RTV-60 a catalyst was used, dibutyl tin dilaurate which is available under the name THERMOLITE-12 of M & T Chemical Corporation, Rahway, New Jersey. In our method we used 0.5% catalyst by weight.

In step (6) (A) and (B) the resilient coating material is forced into the slots 17 located at H which is forward of the molded outer form of the resilient coat 5. In (6) (A) it is applied over the slots 17 before the molds are squeezed thereover and in (B) the uncured resilient material is forced up into the slots by the pressure of the material being forced into the space 64.

We claim:

1. A seal means for use between a stationary member and a movable member, said seal comprising two overlapping metallic members each having a solid portion at one end and having slots forming fingers at the other end, said slots of each metallic member being offset so they are not aligned, silicone rubber encapsulating said fingers to a point adjacent the closed ends of the slots exposing the ends of the slots, said silicone rubber filling the exposed ends of the slots to the tops of the slots, the solid ends of the members being contoured to fit the stationary member, the end of the members having the fingers being shaped to fit the movable member.

2. In an aircraft engine, an exhaust duct, flaps positioned around said exhaust duct having relative angular movement therewith, a seal means located between said exhaust duct and said movable flaps to prevent exhaust gases from passing therebetween, seal means comprising two overlapping metallic members each having a solid portion at one end and having slots forming fingers at the other end, said slots of each metallic member being offset so they are not aligned, silicone rubber encapsulating said fingers to a point adjacent the closed ends of the slots exposing the ends of the slots, the overlapping and contacting portion of the two metallic members having metal-to-metal contact, said silicone rubber filling the exposed ends of the slots to the tops of the slots, the solid ends of the members being contoured to fit the exhaust duct, the solid ends of the members being fixed to the exhaust duct, the ends of the members having the fingers being shaped to fit the surfaces of the flaps which they engage, the ends of the fingers being biased against the flaps.

* * * * *